(12) United States Patent
Elferich et al.

(10) Patent No.: US 6,751,108 B2
(45) Date of Patent: Jun. 15, 2004

(54) POWER SUPPLY INPUT SWITCHING CIRCUIT IMPROVED WITH REGARD TO LINE FAULTS

(75) Inventors: Reinhold Elferich, Aachen (DE); Cornelis Johannes Adrianus Schetters, Nijmegen (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/198,499

(22) Filed: Jul. 18, 2002

(65) Prior Publication Data

US 2003/0021134 A1 Jan. 30, 2003

(30) Foreign Application Priority Data

Jul. 24, 2001 (DE) .......................................... 101 34 976

(51) Int. Cl.[7] .................................................. H02M 5/42
(52) U.S. Cl. ........................................................ 363/84
(58) Field of Search ............................. 363/44, 52, 81, 363/84

(56) References Cited

U.S. PATENT DOCUMENTS

| 3,987,356 | A |   | 10/1976 | Steigerwald | 321/10 |
|---|---|---|---|---|---|
| 4,001,668 | A |   | 1/1977 | Lewis | 323/19 |
| 4,219,872 | A |   | 8/1980 | Engelmann | 363/126 |
| 4,491,903 | A | * | 1/1985 | Montague | 363/48 |
| 4,811,190 | A |   | 3/1989 | Keir et al. | 363/60 |
| 5,088,018 | A | * | 2/1992 | Lee | 363/56.01 |
| 5,396,165 | A | * | 3/1995 | Hwang et al. | 323/210 |
| 5,691,889 | A | * | 11/1997 | Bazinet et al. | 363/89 |
| 5,790,395 | A | * | 8/1998 | Hagen | 363/89 |
| 5,847,550 | A | * | 12/1998 | Schie et al. | 323/222 |

* cited by examiner

Primary Examiner—Adolf Berhane

(57) ABSTRACT

A power supply circuit and a switched-mode power supply with a power supply input circuit are proposed. Known power supply circuits comprise a rectifier supplied with an AC voltage and a first smoothing capacitor. To provide a circuit which is suitable for operation over a wide voltage range, it is proposed that at least a second capacitor be provided which is connected by a switching element to the load terminals so that, when the voltage at the load terminals drops below a voltage threshold, the second capacitor is connected to the load terminals. Further embodiments comprise an apparatus for charging the second capacitor, which is preferably equipped with an apparatus for limiting the voltage at the second capacitor to a charging threshold. By suitable selection of the charging threshold, a capacitor may be used as the second capacitor which, despite a high capacitance value, exhibits a small structural size and low component costs due to the relatively low dielectric strength.

10 Claims, 4 Drawing Sheets

POWER SUPPLY INPUT SWITCHING CIRCUIT IMPROVED WITH REGARD TO LINE FAULTS

Figure 1:
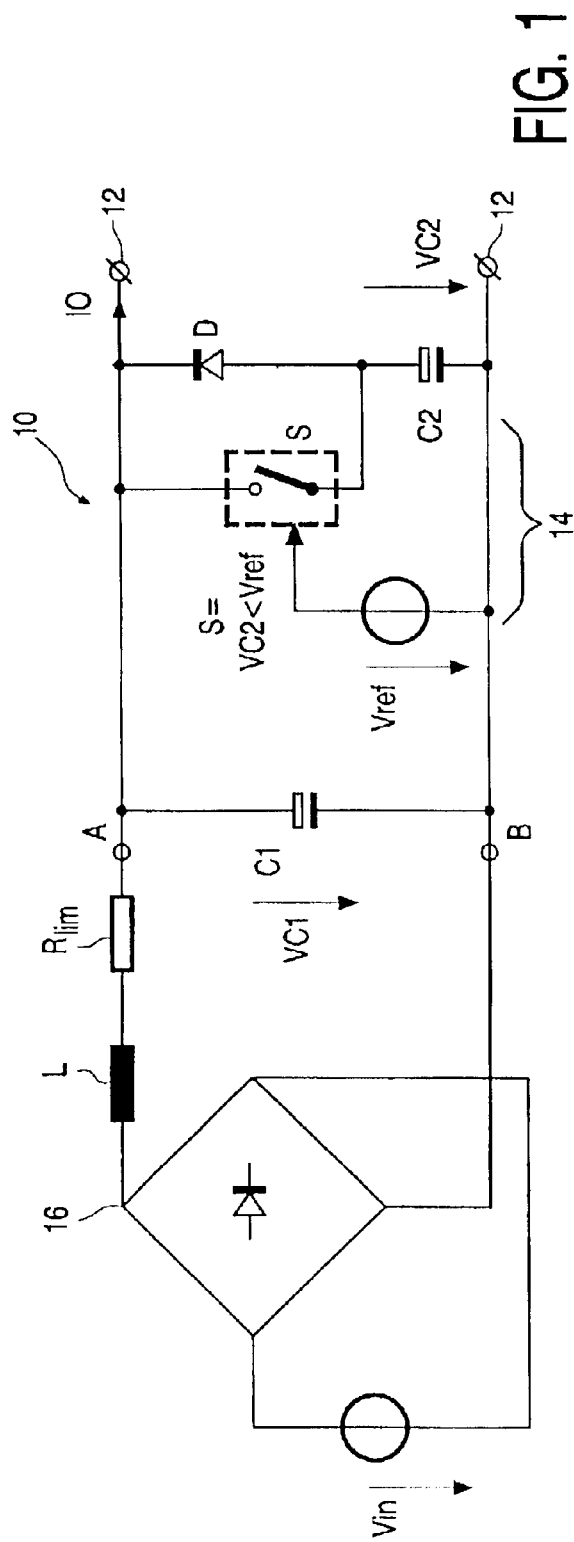

The invention relates to a power supply circuit and to a switched-mode power supply with a power supply input circuit.

Power supply circuits serve to connect a load to an electricity power supply, in particular to the respective electricity power grid.

Known power supply circuits for supplying a DC voltage to a load comprise in this respect a connection to an AC voltage supply, e.g. the electricity power grid, and a rectifier supplied with the AC voltage. In addition, the known power supply circuits comprise further components, including at least a first smoothing capacitor. This is a capacitor with a high capacitance value, often an electrolytic capacitor, which is conventionally connected to the load terminals in parallel with the load and is charged by the rectified voltage or discharged via the load. This capacitor thus effects smoothing of the output voltage. In addition, the power supply circuit optionally comprises further components, for example a filter impedance and a resistor for limiting the current peak.

Simple power supply circuits may serve to deliver an unregulated voltage for an consumer of electricity. However, power supply circuits may also occur as components of other circuits, in particular as the power supply input circuit of a switched-mode power supply. Switched-mode power supplies operate with at least one converter supplied with an intermediate circuit voltage, which converter conventionally supplies a transformer. By suitable actuation of the converter, regulated output voltages may be produced. In such a switched-mode power supply, a power supply circuit serves, as described above, to deliver the intermediate circuit voltage. In this case, the subsequent modules of the switched-mode power supply are connected to the load terminals as a "load". In order to be able more easily to summarize these two possible uses for a power supply circuit in the following text, the designations "load" and "load terminals" are used below even if reference is being made therewith to downstream modules of a switched-mode power supply.

Dimensioning of the components of a power supply circuit, especially the smoothing capacitor, proceeds with reference to predetermined specifications for the circuit. They include input-side specifications for the AC input voltage (minimum, nominal and maximum values for voltage and frequency together with details about specified voltage interferences) and output-side specifications for the load (minimum, nominal and maximum values for current, voltage and power consumption). So as to meet these specifications in all respects, the power supply circuit must be so designed that it still meets the predetermined specifications even in the least favorable operating range for the parameters under consideration (worst case).

With respect to the smoothing capacitor, for example, this means that on the one hand the dielectric strength of the capacitor used has to be so selected that it is sufficient even when the supply voltage assumes the maximum permissible value and at the same time no output power is drawn. On the other hand, the capacitance value of the smoothing capacitor has to be sufficiently high for a sufficiently smoothed voltage to be present at the load terminals. If so planned by the requirements of the circuit, it must additionally even be ensured that, in the event of specified power failures (e.g. 100% power failure for a duration of 50 ms), the minimum output voltage necessary remains ensured even in the event of maximum power being drawn.

If the AC input voltage covers a wider voltage range, a capacitor which exhibits both high dielectric strength and a high capacitance value is often required to fulfill all these requirements. This leads to the use of structural elements of enormous size, which are also correspondingly expensive. If a power supply circuit is to be suitable throughout the world for connection to the electricity power grid (world-wide mains), rms AC input voltages ranging from a minimum of 85 V (specified minimum in USA) to 265 V (specified maximum in Europe) have to be expected.

U.S. Pat. No. 4,001,668 describes an electric razor with a power supply circuit. For operation at different AC input voltages, a switching unit is provided which supplies a load (motor) from a unidirectionally rectified power input line voltage. A filter capacitor is connected in parallel with the load. The load voltage is regulated to a value below a voltage threshold, wherein the voltage threshold lies below the supply transient overvoltage. This circuit allows operation of an electrical consumer at different AC input voltages.

U.S. Pat. No. 4,811,190 describes a circuit for extending operation of an electrical load after interruption of the power supply. The circuit is supplied by a direct current source and includes storage capacitors which are charged by the DC voltage source and kept at a predetermined voltage by means of a regulating circuit. If the power supply is interrupted and the voltage drops below a threshold, a switching device with a diode and an SCR (Silicon Controlled Rectifier) ensures that the storage capacitors are connected in series and this series circuit, in parallel with the optional filter capacitors, is arranged in parallel with the load and supplies it with power, while the filter capacitors are discharged.

It is an object of the invention to provide a power supply circuit and a switched-mode power supply with a power supply input circuit, which is suitable for operation over a wide range of voltages.

According to the invention, at least a second capacitor is provided. This second capacitor is connected by a switching element to the load terminals so that it is connected only when the voltage at that point drops below a voltage threshold.

This may be a fixed voltage threshold, but it is preferable for the switching element to operate as soon as the voltage at the second capacitor is higher than the voltage at the load terminals. For this purpose, a diode may be used as switching element.

The second capacitor is preferably a component with a capacitance value that is at least as high as but preferably higher than the capacitance value of the first capacitor. A capacitance value is proposed for the second capacitor which corresponds to at least twice the capacitance value of the first capacitor, preferably to more than five times, preferably to approximately ten times the capacitance value. It is sufficient in this respect for the dielectric strength of the second capacitor to be at or just above the voltage threshold. The second capacitor is preferably operated at most with a voltage corresponding to a charging threshold which is clearly below the maximum admissible value, according to the specifications, of the voltage at the first capacitor. A component may therefore be used which exhibits a lower dielectric strength (in comparison with the first capacitor), which reduces component costs and structural size.

To simplify the explanation, mention will here always be made of a first and a second capacitor. However, it is known to the person skilled in the art that, instead of using individual capacitors, it is also possible to produce such capacitor elements using in each case circuits with a plurality of capacitors.

According to a further embodiment of the invention, an apparatus is provided for charging the second capacitor. The apparatus for charging the second capacitor is preferably supplied with the rectified voltage. However, it is also possible to use a separate energy source for supplying the charging apparatus. Advantageously, the charging apparatus may comprise an apparatus for limiting the voltage at the second capacitor to a charging threshold, for example a zener diode.

A charging apparatus is preferred which comprises a switching unit by means of which the second capacitor may be connected to the rectified voltage. Charging of the second capacitor is performed in that the switching unit connects the capacitor to the rectified voltage if the voltage at the capacitor drops below a maximum charging threshold. The charging threshold serves to ensure that the second capacitor is not operated above this voltage value, so that a component with a correspondingly low dielectric strength may be used.

If the switching unit connects the second capacitor to the rectified voltage, the second capacitor is charged. This applies at any rate as long as the rectified voltage is higher than the voltage at the second capacitor, which may optionally be ensured by suitable means. Charging of the second capacitor is performed with a charging time constant, which depends to a considerable extent on the incoming resistance, and here in particular on the volume resistance of the switch. It is therefore preferable to use a switch with low resistance, for example an FET. If the voltage at the second capacitor reaches the charging threshold, the switching unit disconnects the second capacitor.

Selection of the voltage threshold is of decisive significance for the operating behavior of the power supply circuit. In the event of the voltage threshold being set very high, i.e. if the maximum possible rectified voltage—according to the specifications—is below the voltage threshold, the second capacitor is always connected by the switching unit, so that the arrangement would correspond to a parallel connection of the first and second capacitors. In this case, however, the switching unit is pointless, so that it is recommended that a voltage threshold be selected that is below the maximum possible rectified voltage according to the specifications. Since the degree of savings that can be achieved with regard to component costs and structural size of the second capacitor is determined by how far the voltage threshold is set below the maximum possible rectified voltage, a threshold voltage is preferred that is clearly, preferably at least 25%, particularly preferably even more than 50%, below the maximum possible voltage.

According to a further embodiment, it is recommended that the voltage threshold be selected so that it is at or above the peak value of the minimum input voltage still admissible within the specifications. For example, for worldwide mains operation, the minimum voltage amounts to 85 V (rms value), so that the voltage threshold here should be 120 V or higher.

On the other hand, however, selecting an extremely low voltage threshold leads to the second capacitor becoming active in an extreme case only if there are relatively long line failures, since only in the case of a relatively long supply voltage failure does the rectified voltage, smoothed by the second capacitor, at the load terminals drop so far that it drops below the voltage threshold. In this case, the second capacitor then merely serves as a buffer for such line failures.

Such behavior may be desirable. However, it is preferable to select a voltage threshold between the two above-mentioned extremes, so that, although on the one hand distinct savings are achieved with regard to component costs and size, the threshold voltage is set high enough for it to become active according to the specification in steady-state operation.

In a conventional instance of operation, the AC input voltage is approximately constant with regard to amplitude for an observed period. The rms value is within the specified range, for example 85–140 V for the electricity power grid in the USA, 189–265 V for the European electricity power grid or 85–265 V for worldwide operation. When a consumer of electricity with a given power consumption is connected, a time profile for the output voltage is then established in steady-state operation at the output terminals, which time profile has a cycle of twice the mains frequency in the case of four-way rectification. In the case of a sinusoidal input voltage, a voltage shape is produced at the smoothing capacitor which follows the shape of the rectified voltage in the form of a "folded up" sine curve, is charged by the first capacitor in the maximum value range and discharges in the zero value range. When only a single smoothing capacitor is used, an output voltage would thus be obtained, the ripple content of which would depend on the capacitance value of the first capacitor.

According to a further embodiment of the invention, it is proposed to use the second capacitor according to the invention with a voltage threshold that is selected so that the voltage at the load terminals is lower at least once per cycle than the charging threshold, so that the second capacitor is active. This covers instances at which the voltage threshold is set so high that the second capacitor is constantly active at typical input voltages. However, it is also possible to select the threshold so that the voltage at the load terminals cyclically drops below the voltage threshold, so that the second capacitor becomes active cyclically. If the voltage threshold is suitably selected, this leads to a less rippled voltage at the output terminals, since, as soon as the voltage drops below the given voltage threshold, the second capacitor is connected, so that a substantially flatter discharge curve is obtained. Up to the next charging process, through the following half-wave the voltage merely drops to a minimum value, which is markedly higher than the minimum value when only the first capacitor is used. Thus, use is made of the second capacitor with regard to voltage smoothing, without a dielectric strength being required which covers the entire input voltage range.

A further embodiment of the invention relates to the choice of voltage threshold especially for operation at two voltage levels, for example world-wide mains operation, with two typical input voltages, for Europe (189 V/230 V/265 V), on the one hand, and the USA (85 V/117V/140 V) on the other. To operate the appliance on the basis of these input voltage stipulations, it is proposed to set the voltage threshold in the range between the peak value of the minimum voltage of the lower voltage level and the peak value of the maximum input voltage of the lower of the two operating voltage levels. For worldwide mains this means a voltage threshold between 120 V (this is the peak value, that is obtained in the case of the minimum rms input voltage of 85 V) and 200 V (corresponds effectively to 140 V, maximum rms value of the US input mains voltage).

The invention will be further described with reference to examples of embodiments shown in the drawings to which, however, the invention is not restricted.

Figure 2:
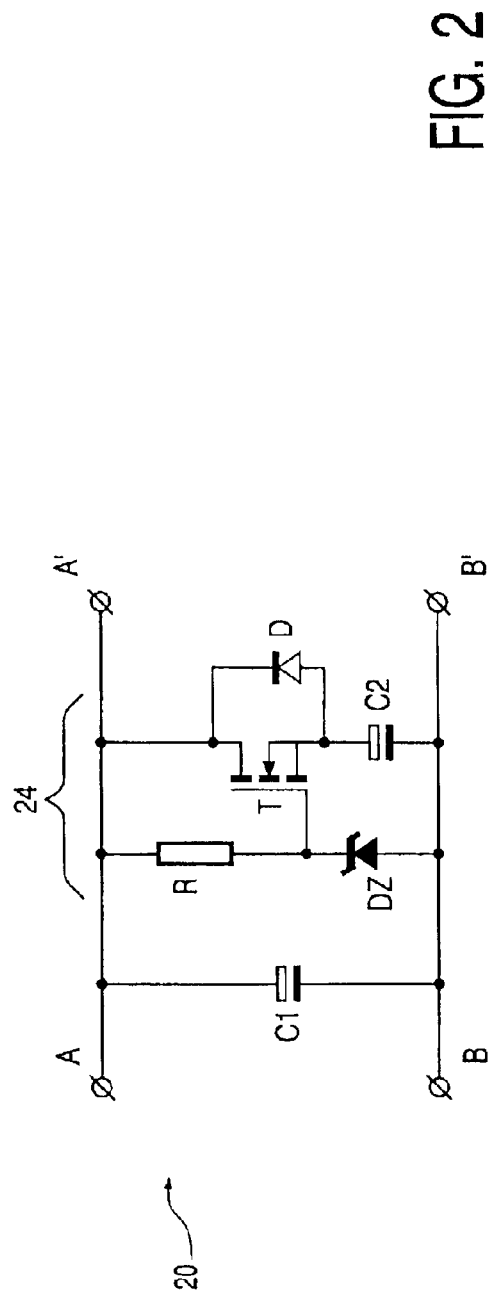
Figure 3:
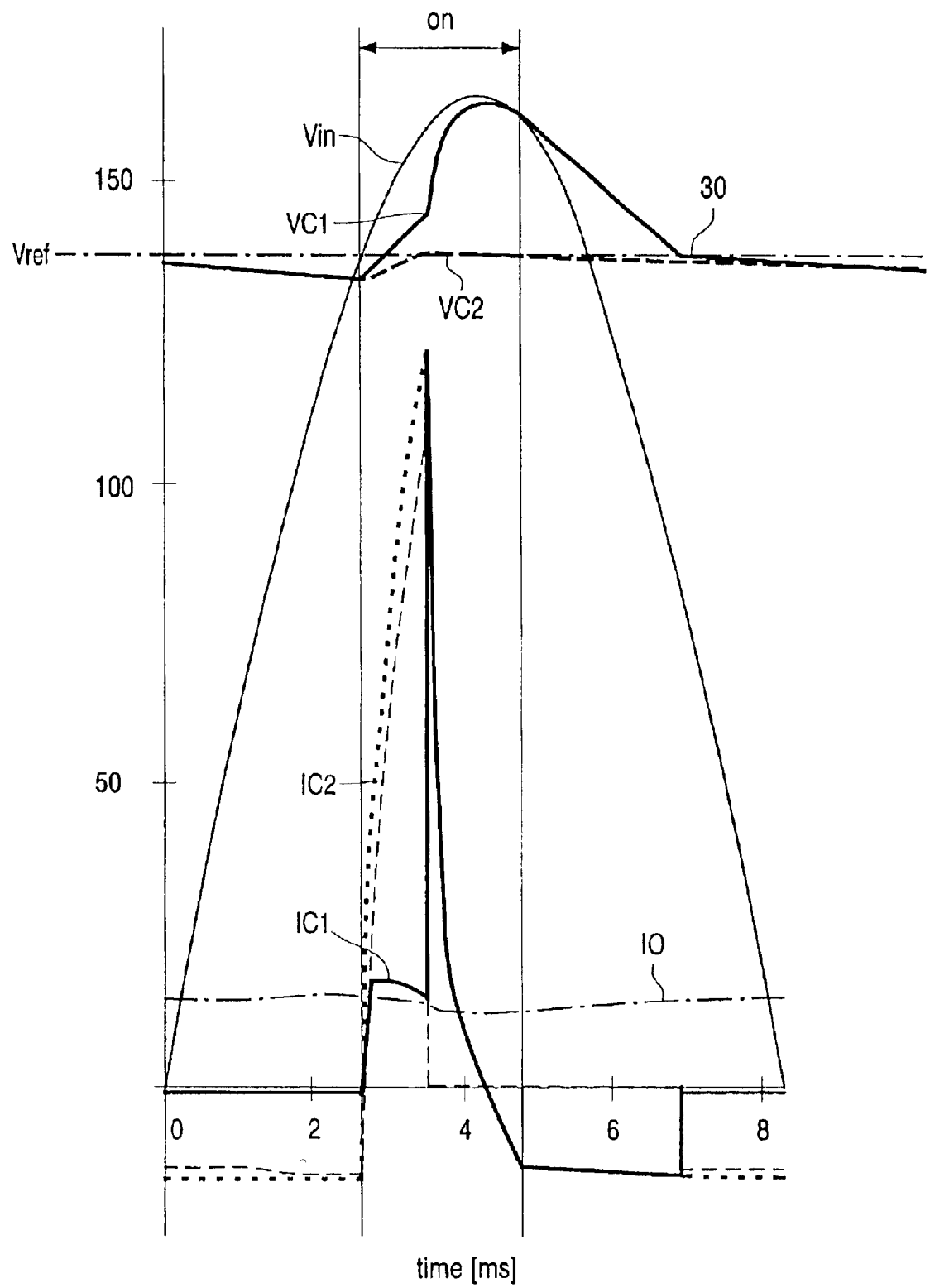
Figure 4:
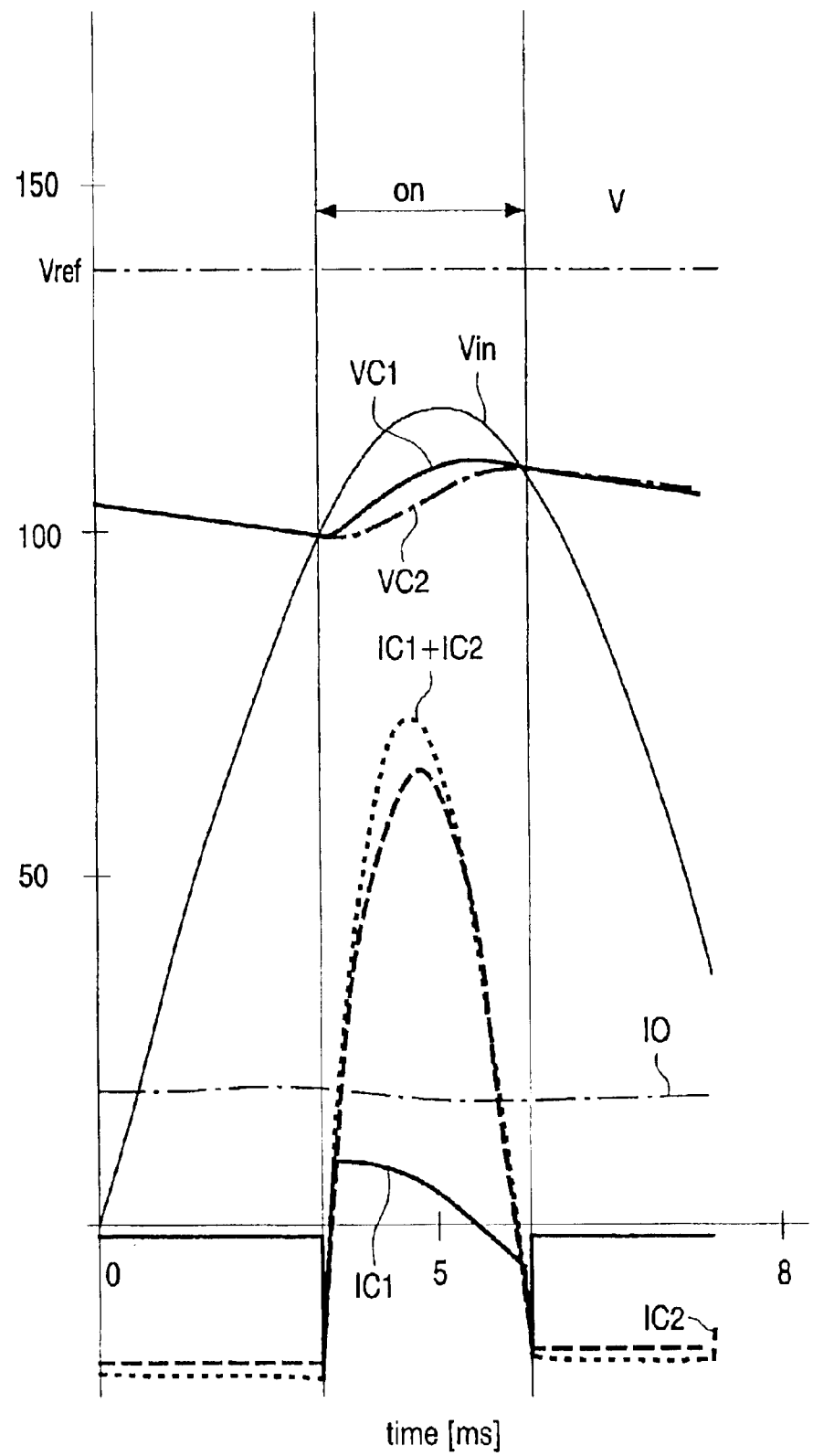
Figure 5:
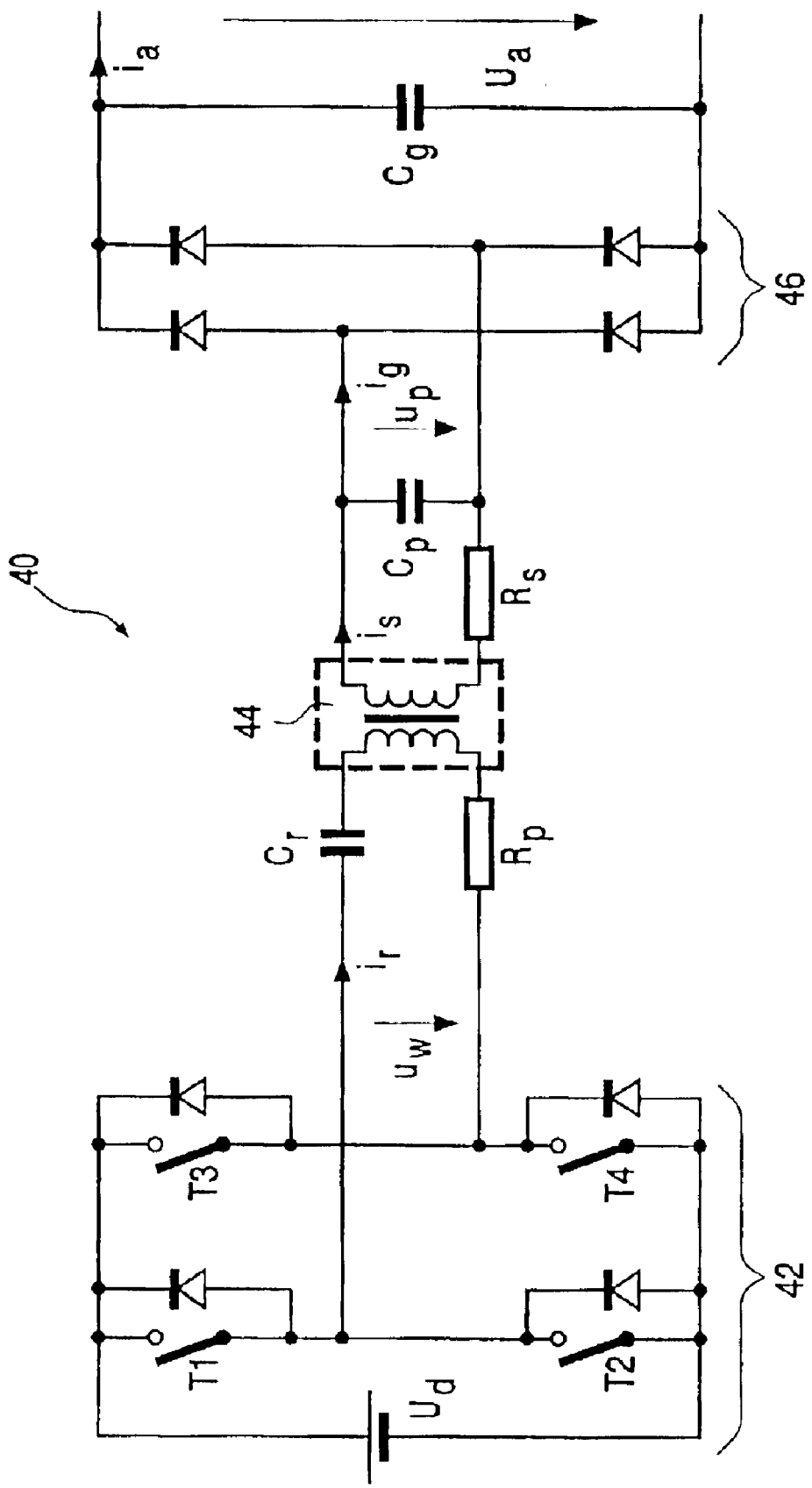

In the drawings:

FIG. 1 shows a circuit diagram of a first embodiment of a power supply circuit,

FIG. 2 shows a circuit diagram of a portion of a second embodiment of a power supply circuit, FIG. 3 shows the timing diagram of voltages and currents in the circuit according to FIG. 1 in a first case of operation, FIG. 4 shows the timing diagram of voltages and currents in the circuit according to FIG. 1 in a second case of operation, FIG. 5 shows a circuit diagram of the switched-mode power supply.

FIG. 1 shows a first embodiment of a power supply circuit 10. This comprises an AC voltage supply $V_{in}$, which supplies power to a four-way rectifier bridge 16. Downstream of the rectifier 16 there is connected a filter inductor L and an ohmic resistor $R_{lim}$ to limit the current peak. A smoothing capacitor C1 is connected between two output terminals 12, between which the voltage $V_{C1}$ drops.

In addition, the circuit 10 comprises a second capacitor C2, via which the voltage $V_{C2}$ drops. The second capacitor C2 is connected in series with a diode D between the output terminals 12. It is charged by the charging unit 14.

The charging unit 14 consists of a controlled switch S and a reference voltage source $V_{ref}$. The switch S is closed, as long as the voltage $V_{C2}$ at the second capacitor C2 is lower than the reference voltage $V_{ref}$. When the switch S is closed, the capacitor C2 is connected in parallel with the first capacitor C1 between the output terminals 12.

The circuit according to FIG. 1 functions as follows: The rectifier 16 is supplied with the sinusoidal DC supply voltage $V_{in}$, so that a highly rippled rectified voltage arises at the output of the rectifier, which consists of "folded up" sinusoidal half-waves. If the second capacitor C2 and the charging device 14 were not present, only the first capacitor C1 would contribute to the smoothing of the output voltage between the output terminals 12, while the capacitor C1 would be charged within the range of the respective half-wave maximum and, upon falling of the supply voltage, discharged via the load connected to the output terminals 12, so that a smoothed but still really rippled profile would be established for the output voltage $V_{C1}$.

The additional use of the second capacitor C2 has the following effect: if the voltage $V_{C1}$ between the output terminals 12 drops below the value of the voltage $V_{C2}$, to which the second capacitor C2 is charged, the diode D becomes conductive and thus connects the capacitors C1, C2 in parallel between the output terminals 12. C1 and C2 then jointly act as one large capacitor, which discharges, more slowly than C1 alone in accordance with the load with an identical power consumption, via the load connected to the output terminals 12.

The charging circuit 14 performs the following function: as soon as the voltage $V_{C2}$ drops below the value of the reference voltage $V_{ref}$, switch S is closed. C2 is then connected to the output of the rectifier 16 (in parallel with C1). C2 is charged by the following rising half-wave of the rectified supply voltage. However, as soon as the voltage $V_{C2}$ at the second capacitor reaches the reference voltage value $V_{ref}$, the switch S is opened and the second capacitor disconnected, so that no further charging occurs. The second capacitor C2 is thus never charged beyond the voltage value $V_{ref}$. A component may therefore be used as the second capacitor C2 which has a dielectric strength that is at or only slightly above the reference voltage $V_{ref}$.

FIG. 2 shows a portion of a second embodiment of a power supply circuit 20. This Figure shows only the right-hand portion of the circuit connected to the terminals A and B (also shown in FIG. 1), the left-hand portion of the power supply circuit 20 being identical with the left-hand portion of the first embodiment of the power supply circuit 10 shown in FIG. 1.

The second embodiment 20 likewise comprises a first capacitor C1 and a second capacitor C2. As with the first power supply circuit 10, the second capacitor C2 is connected in parallel via the diode D to the first capacitor C1, so that the statements made about said first power supply circuit 10 apply here too.

In contrast to the first power supply circuit 10, however, the second power supply circuit 20 contains an apparatus 24 with a zener diode DZ connected in series with a resistor R for producing a reference voltage source $V_{ref}$. The control input of the field effect transistor T, which is connected in series with the second capacitor C2 between the load terminals 12, is connected between the resistor R and the zener diode DZ. The controlled switch S of the first embodiment of a power supply circuit 10 is provided by the transistor T. When the voltage $V_{C2}$ drops via the second capacitor C2 below the voltage level predetermined by the breakdown voltage of the zener diode DZ, transistor T becomes conductive and allows charging of the second capacitor C2 with the rectified supply voltage.

Functioning of the first embodiment of a power supply circuit 10 is described below with reference to the time profiles reproduced in FIGS. 3 and 4. The corresponding explanation also applies to the second embodiment 20, however.

The time profiles illustrated result from the use of a first 33 microfarad, 385 V capacitor C1 and a second 330 microfarad, 160 V capacitor C2. The other component values are: L=0.22 mH, $R_{lim}$=5 Ohms, VZ=138 V, VZnom= 150 V.

FIG. 3 shows the time profile of voltages and currents in the circuit according to FIG. 1 in a first case of operation. In this first case of operation, the power supply input circuit 10 of FIG. 1 is operated with a sinusoidal AC voltage $V_{in}$ with an rms value of 117 V, i.e. a peak value of approx. 165 V and a frequency of 60 Hz. FIG. 3 accordingly shows by a thin line a half-wave of the voltage $V_{in}$. The voltage $V_{C1}$ at the first capacitor C1 is shown in FIG. 3 in a bold line. Only within the central range, which is labeled by a horizontal double arrow designated "ON", is the rectified supply voltage $V_{in}$ greater than the voltage $V_{C1}$ at the first capacitor, so that a current flows through the rectifier 16.

The time profiles of the voltages $V_{C1}$ (bold line) and $V_{C2}$ (broken line) are considered below. At zero ms, both voltages are lower than the voltage threshold $V_{ref}$ of approx. 140 V. The switch S is therefore closed and the capacitors C1, C2 are connected in parallel and discharge via the load terminals 12 in a flat discharge curve. Once the positive half-wave of the supply voltage $V_{in}$ has risen above the voltage value of $V_{C1}$ and $V_{C2}$ (beginning of the ON range), the capacitors C1 and C2 are charged. The time profile accordingly shows a charging curve, the time profile of which is determined by a time constant corresponding to the capacitance value and the charging resistance. Since a certain volume resistance even of the closed switch S has to be assumed here, $V_{C1}$ and $V_{C2}$ are not identical. The two capacitors C1, C2 charge.

As soon as voltage $V_{C2}$ at the second capacitor C2 reaches the voltage threshold $V_{ref}$, switch S is opened. The second capacitor C2 thus remains charged to the voltage level $V_{ref}$. Meanwhile, the first capacitor C1 is further charged, initially indeed very quickly due to the constant current through the inductor L.

Once the supply voltage $V_{in}$ has started to fall (right-hand limit of the "ON" range), the first capacitor C1 discharges initially in a relatively steep discharge curve. If the voltage $V_{C1}$ between the load terminals 12 reaches the voltage threshold $V_{ref}$ (this point of the time profile is labeled with the reference numeral 30), the diode D operates. The capacitors C1, C2 are then connected in parallel between the load terminals 12, so that they discharge, in the event of constant power consumption, in a markedly flatter discharge curve.

The time profile shown in FIG. 3 continues cyclically for the operation indicated (peak value of the input voltage $V_{in}$ approx. 165 V). Altogether, a cyclical time profile is therefore obtained at the load terminals 12 for the voltage $V_{C1}$, which is highly smoothed in the lower range by the second capacitor $V_{C2}$, so that it falls only relatively slightly below the voltage threshold $V_{ref}$ of approx. 140 V.

FIG. 4 again shows the time profile of the voltages and currents of the same circuit, but this time for a second case of operation. In the second case of operation, the circuit from FIG. 1 is operated with a lower input voltage $V_{in}$, the peak value of which is consequently 120 V. This corresponds to connection to the minimum line voltage of 85 V admissible according to the specifications in the USA, at the minimum admissible line frequency of 48 Hz.

In the second case of operation too, a time profile is established which runs in cycles with the input voltage $V_{in}$. Here too, the time profile is initially distinguished by a discharge curve for the voltages $V_{C1}$, $V_{C2}$. From the beginning of the "ON" range, the two capacitors $V_{C1}$, $V_{C2}$ are charged by the rectified voltage. Once the rectified voltage has started to fall (end of "ON" range), the capacitors C, C2 discharge in a common discharge curve via the load terminals 12.

In contrast to the first case of operation shown in FIG. 3, the input voltage level in the second case of operation according to FIG. 4 is so low that the switch S is always closed and the capacitors C1, C2 are accordingly constantly connected in parallel. The voltage $V_{C1}$ supplied thereby at the load outputs 12 exhibits very low ripple content, since this voltage is smoothed by the parallel connection of the capacitors C1 and C2.

As is clear from the above example, the desired result of a well smoothed output voltage $V_{C1}$, in particular with regard to the minimum values, is obtained by combining a first capacitor with low capacitance value (but high dielectric strength) and a second capacitor C2 with high capacitance value, but low dielectric strength. This combination is considerably more favorable both with regard to structural size and with regard to component costs than the use of a single capacitor with both high capacitance value and high dielectric strength.

A number of considerations follow on the design of the power supply circuits 10, 20, in particular on the choice of the voltage threshold $V_{ref}$ are given below.

The starting point for these considerations is the specifications to be met by the circuit. The input specifications depend on the system specifications in the case of connection to the electricity power grid. In the USA the minimum rms line voltage is 85V, the nominal rms line voltage 117 V and the maximum rms line voltage 140 V. In Europe the minimum rms line voltage is 189 V, the nominal rms line voltage 230 V and the maximum rms line voltage 265 V. Consequently, appliances which are intended to be suitable for connection to the electricity power grid throughout the world (world-wide mains) have to start from a minimum value of 85 V, through a nominal value of 117 V to a maximum value of 265 V.

There follow three dimensioning proposals for selecting the charging threshold $V_{ref}$ for "world-wide mains" operation, i.e. input voltages with rms values of 85 V–265 V:

According to the first proposal, the voltage threshold $V_{ref}$ is set at a low level, namely at or just above the minimum peak value of the input voltage.

The advantage of this variant is the extremely low costs for the second capacitor, even if a component with a very high capacitance value is selected.

If, for example, 100 V is set as the minimum voltage at which the load may be operated long-term in steady-state mode, a filter capacitance of 270 microfarads is calculated as being necessary with 75 Watt output power. This results from the minimum voltage which amounts to 85 V rms or 120 V peak value. If component tolerances and any safety clearances are initially left out of consideration, the voltage threshold $V_{ref}$ may likewise be set at 120 V. If the charging resistance for the second capacitor is sufficiently slight for it to be considered being connected approximately in parallel, the following selection may be made: C1=47 $\mu$F, C2=270 $\mu$F-47 $\mu$F 220 $\mu$F. In comparison with the conventional construction of a single 270 microfarad capacitor, at full dielectric strength a reduction to a good 40% is observed with regard to the respective anticipated storable charge (maximum voltage×capacitance), which broadly speaking corresponds to the respective total capacitor volume. With regard to the anticipated storable energy levels, a reduction to a good 20% is obtained. Setting the threshold lower than 120 V leads to low exploitation of the remaining voltage excursion, over which only the load supply proceeds in the range of input voltage zero values, and would require an unusually large capacitor C2. A threshold which is thus geared to the peak value of the lowest input voltage thus means minimization of the total capacitor volume required and corresponding costs.

If the US level voltage as outlined above is operated at higher input voltages than the minimum input voltage, an additional possible result is that the voltage exceeds or drops below the voltage threshold at twice the mains frequency. The switching on and off of capacitive currents effected thereby may be undesirable and, in the case of an unfavorable design, generate emissions which may lead under certain circumstances to disturbance of nearby circuit components.

The second proposal provides the use of a 160 V capacitor as a second capacitor together with a charging voltage threshold $V_{ref}$ likewise of approximately 160 V. With this proposal too, synchronous switching of the switch S proceeds in US supply system operation at typical input voltages. This switching may, as described above, be undesirable for some applications, if disturbances occur as a result.

These cyclical switching processes are dispensed with in accordance with a third proposal if a voltage threshold is selected between the maximum peak value of the lower (here US) voltage level and the minimum peak value of the higher (here European) voltage level. In accordance with the third proposal, the voltage threshold for world-wide mains should thus amount to between 200 and 260 V. Accordingly, a capacitor with a dielectric strength at or just above the selected voltage threshold may be used as C2. Operation at typical US input line voltages will then result in a time profile approximately as reproduced in FIG. 4. However, the savings with regard to component size and costs are lower. With this choice of voltage threshold, it is especially advantageous to use a switch S (or transistor T) that exhibits particularly low resistance in the transition state, e.g. approx. 0.5 to 2 ohms, preferably approx. 1 ohm, for example a field effect transistor.

For "world-wide mains" operation, this choice of voltage threshold has the effect that the second capacitor is constantly active when connected to the electricity power grid according to US specifications while it is not generally active at all in the case of connection to the European electricity power grid (since here all operations are carried out above the voltage threshold).

Within the stated range from 200 to 260 V, the lower end of the range is preferable due to the greater savings that can be achieved there. If $V_{ref}$ is set at 200 V, a reduction in the anticipated storable charge to just 60%, and with regard to energy to just 40 %, is obtained. Taking the specifications as basis, it is not necessary to support the voltage at the higher (here European) voltage level. For high level operation, a smaller capacitor is sufficient, anyway, with approx. ¼ of the capacitance value compared to the low US level. An example of component dimensioning according to the third proposal would be $V_{ref}$=200 V, C1=47 µF. With an output power of 75 watts, the voltage VC1 reaches a minimum value of 215 V, i.e. it never drops below the voltage threshold in the European electricity power grid (with the exception of line failures).

When using components that are currently commercially available, it should be noted that these are frequently only sold in series with fixed dielectric strengths (e.g. 100 V, 160 V, 200 V). Since tolerances have also to be taken into consideration for the voltage of a zener diode, the person skilled in the art has to take account of these tolerances or available component values when using such standard components.

FIG. 5 shows a circuit diagram of a switched-mode power supply 40. The switched-mode power supply 40 comprises an inverter 42, which supplies the primary side of a transformer 44. On the secondary side, a rectifier 46 is connected to the transformer 44, which generates a direct output voltage $U_a$. The switched-mode power supply according to FIG. 5 is constructed in the conventional manner known to the person skilled in the art as a resonant structure, wherein a resonant capacitor $C_r$ forms a resonant structure with the leakage inductance of the transformer 44, so that a regulated output voltage $U_a$ may be produced by generating a pulse width-modulated voltage $U_a$ by cyclical switching of the switches T1, T2, T3, T4.

These and other circuits for switched-mode power supplies are known to the known to the person skilled in the art and do not therefore need to be explained in any more detail.

In FIG. 5, the converter 42 is supplied with power by a DC voltage source $U_d$. When the switched-mode power supply 40 is connected to the electricity power grid, the first embodiment of a power supply circuit 10 or the second embodiment of a power supply circuit 20 is used for the DC voltage source $U_d$, wherein the converter 42 is connected to the respective load terminals 12 as load. In this case, the power supply circuit 10, 20 forms a power supply input circuit within the switched-mode power supply 40.

The invention may be summarized to the effect that a power supply circuit and a switched-mode power supply having a power supply input circuit are proposed. Known power supply circuits comprise a rectifier supplied with an AC voltage and a first smoothing capacitor. To provide a circuit which is suitable for operation over a wide voltage range, it is proposed that at least a second capacitor be provided which is connected by a switching element to the load terminals so that, when the voltage at the load terminals drops below a voltage threshold, the second capacitor is connected to the load terminals. Further embodiments comprise an apparatus for charging the second capacitor, which is preferably equipped with an apparatus for limiting the voltage at the second capacitor to a charging threshold. By suitable selection of the charging threshold, a capacitor may be used as the second capacitor which, despite the high capacitance value, exhibits a small structural size and low component costs due to the relatively low dielectric strength.

What is claimed is:

1. A power supply circuit comprising:
   a rectifier, supplied with an AC voltage, that is configured to provide a rectified voltage,
   a first smoothing capacitor for smoothing the rectified voltage,
   load terminals, to which the rectified voltage is applied, and
   at least a second capacitor that is connected by a switching element to the load terminals so that, when the rectified voltage at the load terminals drops below a predefined voltage threshold, the second capacitor is connected to the load terminals.

2. A power supply circuit as claimed in claim 1, in which the switching element is a diode, and
   the voltage threshold is a predefined voltage applied to the respective second capacitor.

3. A power supply circuit as claimed in claim 1, in which a charging apparatus is provided for charging the second capacitor.

4. A power supply circuit as claimed in claim 3, in which the charging apparatus comprises an apparatus for limiting the voltage at the second capacitor to a charging threshold.

5. A power supply circuit as claimed in claim 3, in which the charging apparatus comprises
   a switching unit, which,
      if the voltage at the second capacitor drops below a charging threshold, connects the second capacitor to the rectified voltage, so that the second capacitor may be charged, and,
      if the voltage at the second capacitor exceeds the charging threshold, disconnects the second capacitor from the rectified voltage.

6. A power supply circuit as claimed in claim 4, in which the power supply circuit is designed for an input voltage range with a minimum input voltage and a maximum input voltage, and
   the charging threshold is above the minimum input voltage.

7. A power supply circuit as claimed in claim 4, in which the power supply circuit is designed for an input voltage range with a minimum input voltage and a maximum input voltage, and
   the charging threshold is below the maximum input voltage.

8. A power supply circuit as claimed in claim 4, in which the charging threshold is set so high that, in nominal operation, the voltage at the load terminals is lower than the charging threshold at least once per cycle.

9. A power supply circuit as claimed in claim 3, in which the circuit is designed for operation in at least two line voltage ranges, a first, lower line voltage range is specified at least by minimum and maximum peak values of the input line voltage, and a second, higher line voltage range is likewise specified at least by a minimum and a maximum value for the peak value of the input line voltage, wherein the voltage threshold is so selected that it is equal to or higher than the peak value of the maximum voltage in the first, lower voltage range, and lower than or equal to the peak value of the minimum voltage of the second, higher voltage range.

10. A switched-mode power supply comprising at least one power supply circuit that is configured to be connected to an AC voltage supply to provide an intermediate circuit voltage, and at least one converter supplied with the intermediate circuit voltage, wherein the power supply circuit is constructed as claimed in claim 1.

* * * * *